(No Model.) 2 Sheets—Sheet 1.

H. WESTPHAL.
BICYCLE RACK.

No. 573,171. Patented Dec. 15, 1896.

Witnesses:
R. J. Jacker.
C. A. Duggan.

Inventor:
Henry Westphal.
By Chas. C. Tillman
Atty.

(No Model.) 2 Sheets—Sheet 2.
H. WESTPHAL.
BICYCLE RACK.
No. 573,171. Patented Dec. 15, 1896.
Fig. 8. Fig. 9.
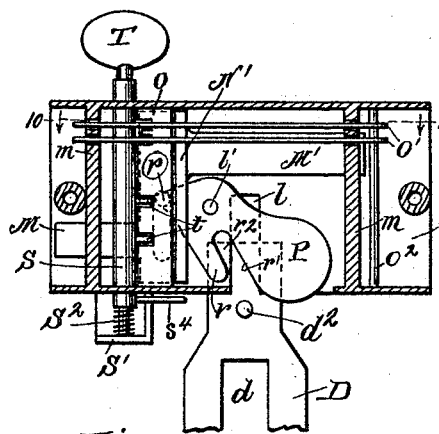
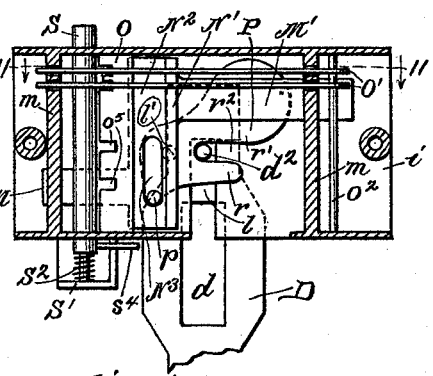
Fig. 10. Fig. 11.
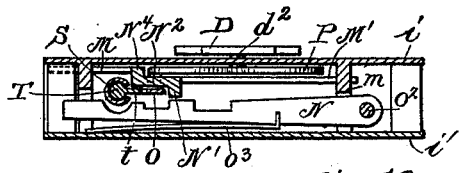
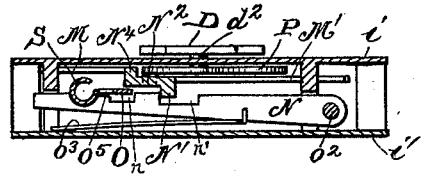
Fig. 12. Fig. 6.
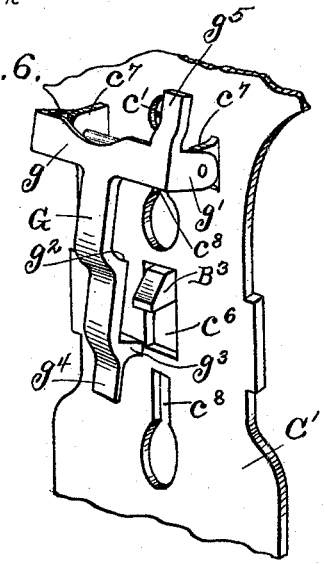
Fig. 7. Fig. 13.
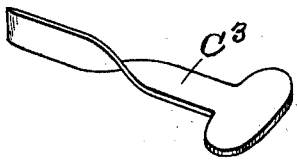
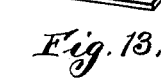
Witnesses:
R. J. Jacker,
E. A. Duggan.
Inventor:
Henry Westphal.
By Chas. C. Tillman,
Atty.

UNITED STATES PATENT OFFICE.

HENRY WESTPHAL, OF CHICAGO, ILLINOIS.

BICYCLE-RACK.

SPECIFICATION forming part of Letters Patent No. 573,171, dated December 15, 1896.

Application filed January 20, 1896. Serial No. 576,126. (No model.)

*To all whom it may concern:*

Be it known that I, HENRY WESTPHAL, a citizen of the United States, residing at Chicago, in the county of Cook and State of Illinois, have invented certain new and useful Improvements in Bicycle-Racks, of which the following is a specification.

This invention relates to improvements in racks or holders to be used for supporting and locking bicycles in an upright position, so as to prevent their removal; and it consists in certain peculiarities of the construction, novel arrangement, and operation of the various parts thereof, as will be hereinafter more fully set forth and specifically claimed.

The objects of my invention are, first, to provide a rack or holder in which one of the wheels of the bicycle may be locked and supported in an upright position, and, second, such a rack or holder which may be readily secured to a suitable support in such a manner that it cannot be removed therefrom except by the use of a key which may be employed for unlocking or releasing the wheel, or by means of a key or other instrument employed solely for the purpose of disconnecting the rack from the support.

In order to enable others skilled in the art to which my invention pertains to make and use the same, I will now proceed to describe it, referring to the accompanying drawings, in which—

Figure 1:
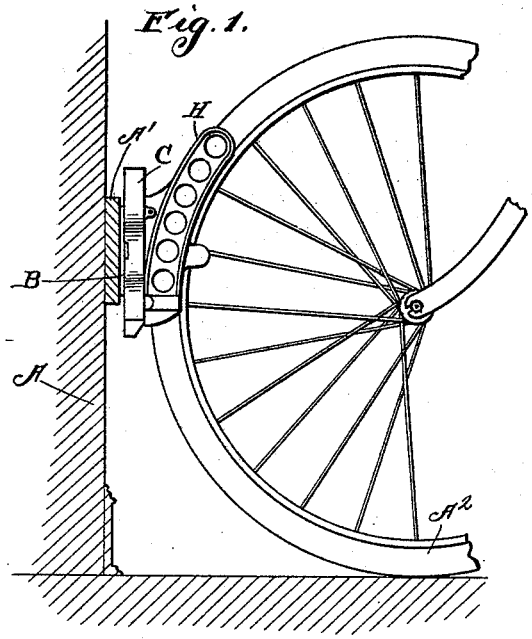
Figure 2:
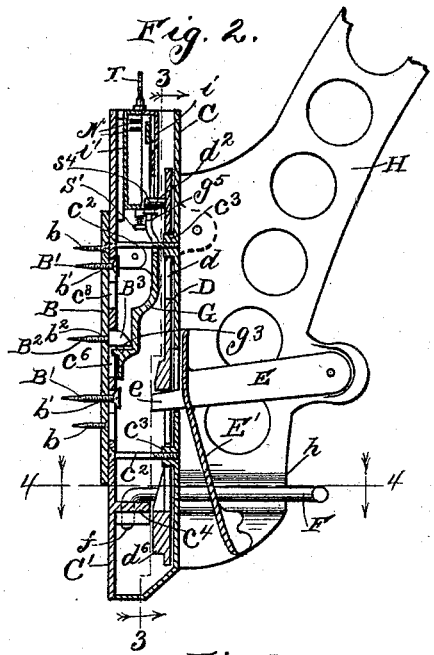
Figure 3:
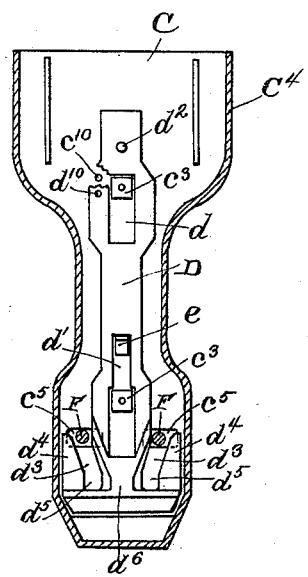
Figure 4:
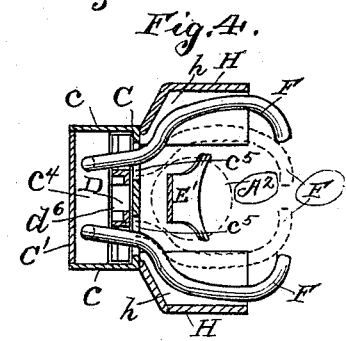
Figure 5:
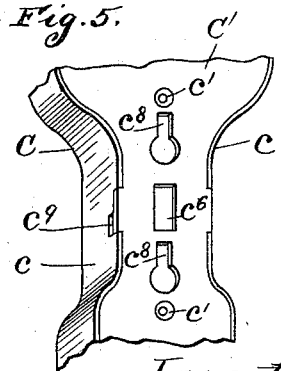

Figure 1 is a view in side elevation of a portion of the wheel of a bicycle, showing it held in an upright position by means of my rack secured to the wall or other suitable support. Fig. 2 is an enlarged vertical sectional view of a portion of the rack or holder with the locking mechanism and illustrating the parts in the positions they will occupy when secured on the wall or support and when ready to receive the wheel. Fig. 3 is a vertical sectional view taken on line 3 3 of Fig. 2. showing the interior of the front part of the casing and the sliding or operating bar in position thereon. Fig. 4 is a plan sectional view taken on line 4 4 of Fig. 2, showing by continuous lines the position the latches will occupy when ready to receive the wheel and by dotted lines their position when the wheel shall have been placed in the rack. Fig. 5 is a rear perspective view of a portion of the casing for the operating mechanism. Fig. 6 is a perspective view of the interior of a portion of the rear plate or part of the casing, showing the dog or detent pivoted thereto and adapted to engage a catch on the support to prevent the removal of the rack. Fig. 7 is a perspective view of a key to be used for disengaging the dog or detent from the catch. Fig. 8 is a view in elevation, partly in section, of the lock used in the rack with one of the plates of the casing thereof removed, showing the key locked in and a portion of the operating-bar of the rack to engage the lock. Fig. 9 is a view in elevation, partly in section, of the lock with one of the plates of the casing thereof removed, showing the position of the parts when the key is removed. Fig. 10 is a plan sectional view taken on line 10 10 of Fig. 8. Fig. 11 is a like view taken on line 11 11 of Fig. 9. Fig. 12 is a perspective view of the lock with one of the plates of the casing, the key-guide, stay, and tumblers removed; and Fig. 13 is a plan view of a portion of the top of the lock-casing, showing the keyhole.

Similar letters refer to like parts throughout the different views of the drawings.

A represents the wall or other suitable support to which the rack may be secured at a proper height to engage and lock the wheel. To the wall or support A or to a horizontal board or piece A' thereon may be secured by means of screws $b$ or otherwise a guide-plate B, having openings $b'$ $b^2$, which I usually employ to indicate the proper positions of the retaining-screws B' and catch $B^2$ for the casing and pivoted dog or detent therein, as will be presently explained.

While I prefer to use the plate B for the purpose of a guide, as above set forth, yet I may omit the same and secure the retaining-screws B' and catch $B^2$ to the support without employing it. The casing is composed of a hollow or box-like front portion C of substantially the shape illustrated in Figs. 2 to 5, inclusive, of the drawings, and has secured on its walls or sides $c$, near their rear edges, a back plate C', which is formed with openings $c'$ for the reception of suitable bolts or screws $c^2$, which engage the bosses $c^3$ on the inner surface of the box or front portion C, as shown in Fig. 2, and hold the two portions firmly together. These bosses $c^3$, as shown, are preferably rectangular in shape and may act as guides for the operating-bar D, which is formed with vertical slots $d$ and $d'$ in its upper and lower portions, respectively, for the reception of the bosses $c^3$, and the lower one also for the reception of the projection $e$ on the arm E' of the pivoted lever E, which is raised by the pressure of the wheel $A^2$ of the bicycle against the arm, which depends in front of the casing and near the securing-latches. The upper end of the operating-bar D is provided on its rear surface with a pin or projection $d^2$ to engage the cam of the locking mechanism employed for securing the bar in a raised position, and which is located in the upper and enlarged part $C^4$ of the casing. The lower portion of the operating-bar D is formed with slots $d^3$ at each side of the lower vertical slot $d'$ for the reception and operation of the inner parts of the securing devices or latches F, which are bent or curved, as shown in Fig. 4, and have the bearings for their inner and downturned ends $f$ in a suitable ledge $c^4$ on the back plate C' of the casing. These latches extend through suitable openings $c^5$ in the box or front part C and near its lower end.

As is clearly shown in Fig. 3 of the drawings, the slots $d^3$ in the lower portion of the sliding or operating bar D are inclined inwardly or toward each other and then made vertically, thus forming of the lower part of said bar an anchor-shaped piece having flukes or arms $d^4$, which are so beveled on their adjacent surfaces as to cause the free ends of the latches or securing devices F to be drawn toward each other when the operating-bar is raised, in which position the inner portions of the latches F or the horizontal portions thereof between the front of the casing and their downturned ends will rest in the vertical parts $d^5$ of the slots $d^3$, thus preventing the possibility of forcing the sliding or operating bar D downward by prying apart the outer or free ends of the latches, as might occur if the inner portions of the latches rested on the inclined part of the slots.

It will also be observed by reference to Fig. 2 of the drawings that the rear surface of the lower part of the operating-bar is formed with an enlargement $d^6$ to rest loosely against the ledge $c^4$ of the back plate, thus aiding in holding the bar in its proper position against the inner surface of the front part of the casing.

The back part or plate C' of the casing is formed at about its middle with an elongated opening or slot $c^6$, through which may extend into the casing the head $B^3$ of the catch $B^2$ for the pivoted dog or detent G, which is of substantially the form illustrated in Figs. 2 and 6 of the drawings, i. e., is formed at its upper part with a transverse portion $g$, having its ends bent at right angles thereto to form the arms $g'$, which are pivotally connected to suitable lugs $c^7$ on the inner surface of the back plate C' at a suitable distance above the slot or opening $c^6$ therein. The upright portion of the dog or detent G is formed with ledges or steps $g^2$ and $g^3$ on its surface adjacent to the back plate and with an extension $g^4$ at its lower end. The step or ledge $g^3$ is designed to engage the lower part of the head $B^3$ of the catch $B^2$, which head has its upper part beveled, as shown, in order to permit the step or projection $g^3$ to pass freely thereover when the casing is being placed in position. The upper part of the cross-piece $g$ of the dog is formed or provided with an arm $g^5$ to engage a pin or projection $s^4$ on the key-guide S of the lock, which pin may be used for the double purpose of disengaging the step or projecting portion $g^3$ of the dog from the head $B^3$ as well as to prevent the key-guide being turned too far.

Just above and below the opening $c^6$ in the back plate are formed other openings, $c^8$, which are enlarged at their lower parts to admit of the heads of the retaining-screws B', which are inserted through said enlarged portion, after which the plate C' is pressed downward, the shanks of the screws B' fitting in the upper parts of the openings $c^8$, as shown in Fig. 2, in which position the step or projecting part $g^3$ of the dog will engage the lower surface of the head $B^3$ of the catch $B^2$ and prevent the casing being lifted or removed from the retaining-screws, whose heads are larger than the reduced part of the slots $c^8$ and rest on the inner surface of the back plate. In the casing and operating-bar D and in front of the arm $g^5$ of the dog are formed openings $c^{10}$ and $d^{10}$, through which may be passed a wire or other instrument to contact with said arm and thereby disengage the dog from the retaining-catch. This can be done only by partially raising the bar D by pressing on the arm E' of the lever E and causing the projection $e$ to lift the bar until the opening $d^{10}$ therein is brought into alinement with the opening $c^{10}$ in the casing, for it is obvious that when the bar is raised so as to lock the wheel in the rack, or lowered, as shown in Fig. 3, the openings will be out of alinement and it will be impossible to reach the arm $g^5$ therethrough.

Sometimes I form one of the walls $c$ of the box or front part C of the casing at a point on a horizontal line with the extension $g^4$ of the dog or detent with an opening $c^9$, through which a key $C^3$ or other suitable instrument may be inserted, between the inner surface of the back plate C' and said extension, to disengage the dog from the head $B^3$ of the catch. For this purpose I prefer to use a key made of flat material and twisted, as shown in Fig. 7, so that by forcing the end of said key into the casing it, the key, will be turned by reason of the twist therein and will liberate the dog from the catch. It is obvious, however, that other forms of keys or instruments may be used for this purpose.

To the face or front of the casing and near each side thereof are secured in any suitable manner side pieces H, which may be of any ornamental design and shape, but preferably somewhat circular, as shown, to conform to the curve of the tire of the wheel. These side pieces are placed parallel with each other and at a sufficient distance apart to admit of the free insertion therebetween of the tire, and are formed in their lower parts with recesses $h$ or outward bends for the reception and movement of the latches F. To one of the side pieces H is pivoted the lever E, which has secured thereto or formed integral therewith at its inner end a downturned and outwardly-projecting arm E′, on the rear surface of which and extending through the slot $d'$ in the casing is a lug or projection $e$ to engage and lift the sliding or operating bar D, as before mentioned.

By reference to Figs. 2 and 4 of the drawings it will be seen that the arm E′ extends downward between the latches F, so that when the wheel is inserted between said latches and pressed against said arm the bar D will thereby be raised, which operation, through the medium of the inclined slots $d^3$ in the lower part of the bar, will cause the latches to assume the position indicated by dotted lines in Fig. 4, thus embracing the tire of the wheel and preventing its removal.

The lock which I prefer to use and which is herein illustrated is of the same construction which is set forth and claimed in Letters Patent No. 532,506, issued to me on January 15, 1895, and consists of two plates $i\ i'$, the plate $i$ being formed with a vertical slot $l$ near its middle, which extends through the bottom of the casing, as shown, and having on its inner surface close to each of its ends the ribs $m\ m'$, both of which are formed with openings or recesses $m^2\ m^3$, in which the sliding bolts M M′ operate and are thereby guided in their backward and forward movements. The opening or recess $m^2$ is formed near the lower portion of the rib $m$ and the opening or recess $m^3$ near the upper end of the rib $m'$.

Near their upper portions, and on their surfaces adjacent to the plate $i'$, each of the ribs $m$ and $m'$ is formed with recesses or mortises $m^4$ for the reception and operation of the spring-actuated tumblers N, which are formed with recesses $n\ n'$, the former of which engages with the stay O and the latter with the sliding rib or bead N′ on the piece N², which unites the sliding bolts M and M′ and is preferably formed in cross-section, as shown in Figs. 10 and 11, with two projections N′ and N⁴ at its edges extending in opposite directions, the flat piece N² being provided near its lower portion with a vertical slot N³, in which fits and operates a pin or lug $p$ on the bifurcated cam P, which cam is pivotally secured to the plate $i$ at a suitable point near the outer portion of the slot $l$ therein, as shown at $l'$. This cam is made, as clearly shown in Figs. 8, 9, and 12, with two prongs $r\ r'$, which form an open slot or fork $r^2$, into which will engage the lug or pin $d^2$ on the bar D.

As shown in Figs. 8, 9, and 10, the tumblers N are pivotally secured, as at $o'$, on the rod $o^2$, having its bearings in the top and bottom of the casing near the farther end from the key-guide, and are provided with springs $o^3$, which are interposed between the tumblers and the plate $i'$, and that they will be thus forced forward to engage with the bead or rib N′ on the sliding piece N².

Near the rib $m$ the casing is provided in its top and bottom with suitable circular openings $a$, through which is passed a split tube or key-guide S, which has its bearings for its lower end in the depending bracket S′ on the bottom of the lock-casing. The lower end of the key-guide S is provided with a spring $s^2$, which serves to revolve the key-guide, with the split therein through which the projection $t$ on the key T passes to engage with the tumblers, into alinement with the openings $a^3$ therefor in the top of the casing and is prevented from turning the guide too far by means of the lug or pin $s^4$, secured thereto, which is so placed that it will strike the bracket S′, which acts as a check.

The stay O, which is provided with a number of recesses $o^5$ to correspond with the number of projections $t$ on the key T, is rigidly secured in a vertical position and longitudinally with the lock-casing between the bead N′ and the key-guide and between the tumblers and the piece N². This stay is employed to regulate the combination of the lock, for it is obvious that the projections $t$ on the key must correspond in number and dimensions with the recesses in the stay. Otherwise they would not pass through the same.

It is evident that the pin or projection $d^2$ on the bar D will extend into the slot $l$ of the plate $i$ of the lock and will engage with the open slot $r^2$ or fork between the prongs $r$ and $r'$ on the cam P, when the pressure of the wheel against the arm E′, through the medium of the projection $e$, will lift the bar D, provided, as before stated, with the projection or pin $d^2$, engaging with the prongs $r$ and $r'$, and will cause the cam P to be raised to the position indicated in Fig. 9, the movement of which cam by means of its pin $p$, operating in the slot N³ of the plate N², will cause the sliding bolts M and M′ and the bead N′, which are connected to the plate N² or made integral therewith, to be retracted to the position shown in Fig. 9, which operation removes the plate N² from interference with the projections on the shank of the key, and thus permits the key-guide S to be partially revolved by means of the spring $s^2$ till the projections of the key are in alinement with the openings $a^3$ in the top of the casing, when, and not before, the key may be withdrawn, and the operating-bar D will be securely locked in said position by reason of the engagement of the tumblers N with the bead N′.

In order to release or unlock the operating-bar D, it will be necessary to replace the key in the key-guide, when by turning the same its projections will engage the tumblers and will free them from engagement with the bead N', when by reason of the weight of the bar D and cam P they will be lowered, as shown in Fig. 8, which operation will interpose the plate $N^2$ between the projections on the key-shank and the opening $a^3$ in the top of the casing and prevent the key being removed.

In my application for patent for an improvement in a rack or stand for bicycles, filed September 14, 1895, Serial No. 562,509, I have shown and claimed a stand comprising a locking mechanism, latches to engage the wheel of the bicycle, a connection uniting the latches and lock, and a lever adapted to place and secure the latches in engagement with the wheel by the pressure thereof, and show, but do not broadly claim, in the present application said construction.

Having thus fully described my invention, what I claim as new, and desire to secure by Letters Patent, is—

1. The combination with a rack or stand, of a pair of latches pivotally secured therein and adapted to engage the wheel of a bicycle, a locking mechanism located in the rack, a sliding bar having at its upper portion means to engage the lock, and inwardly-inclined slots in its lower part for the latches, and a lever fulcrumed to the rack and adapted to engage the sliding bar and raise the same by the pressure of the wheel, substantially as described.

2. The combination with a rack or stand, of a pair of latches pivotally secured therein and adapted to engage the wheel of a bicycle, a locking mechanism located in the rack, a sliding bar having at its upper portion means to engage the lock and provided in its lower part with inwardly and downwardly inclined slots for the latches, said slots terminating in vertical openings, and a lever fulcrumed to the rack and adapted to engage the sliding bar and raise the same by the pressure of the wheel, substantially as described.

3. The combination with a rack or stand, of a pair of latches pivotally secured therein, a locking mechanism located in the rack, a sliding bar having at its upper part means to engage the lock, an opening $d^{10}$, and means at its lower part to engage the latches, means for raising the bar, retaining devices secured to a support, a dog having an arm $g^5$, and pivoted to the casing, and adapted to engage one of the retaining devices, a casing having openings in its rear for the reception of the retaining devices, and an opening $c^{10}$, in its face for the insertion of a pin or the like to pass through the opening $d^{10}$, in the bar and to contact with the arm $g^5$, of the dog, substantially as described.

HENRY WESTPHAL.

Witnesses:
CHAS. C. TILLMAN,
E. F. DUGGAN.